Patented June 15, 1954

2,681,326

UNITED STATES PATENT OFFICE 2,681,326

WATER REDUCIBLE FIRE-RETARDANT COATING COMPOSITIONS

Conrad J. Christianson, Harvey, Ill., assignor to The Sherwin-Williams Company, Cleveland, Ohio, a corporation of Ohio No Drawing. Application August 26, 1950, Serial No. 181,705

12 Claims. (Cl. 260—39)

This invention relates to a novel coating composition useful in retarding the spread of unfriendly fires, and, more especially, to a fire-retardant coating composition suitable for application in hazardous locations or locations constructed of paper, cloth and other construction material capable of flame propagation.

It is an object of this invention to provide a fire-retardant composition having latent therein high heat insulative quality.

It is another object of this invention to provide a water-reducible coating composition from which a smooth film may be deposited both upon new and previously painted surfaces, which has an acceptable appearance upon drying, after application by brushing, spraying, dipping or rollercoating.

It is a further object to provide a water-reducible coating which will be stable after preparation for use for a period of several weeks without going solid.

It is a more specific object to provide a fireretardant coating which, after activation by flame, is characterized by a voluminous intumescence wherein there is a manifold cell development of uniformly small size, and further characterized by strong "bridging" by means of pillars which develop between the base material coated and the expanded insulative blanket of fire-retardant coating.

The prior art treats extensively of coatings and compositions useful to retard the progress of unfriendly fires. Periodic disasters occur wherein many lives are lost due to the rapid spread of flames, and heretofore while the treating materials offered for hanging fabrics and other combustibles within public buildings are effective, they are not in universal use. Ignition of drapes, curtains and decorations caused extreme heat for short but sufficient duration to sweep through halls and corridors and thus to ignite more massive combustible trims and painted portions of the interiors of buildings and over areas repainted with innumerable layers of conventional drying oil-containing coatings. While many fire-retardant coating compositions have been suggested and a hundred or more patents have been issued covering various approaches to the problem, fire-retardant coatings have not as yet been favored with public acceptance. Lack of public acceptance is believed due in part to the general lack of character of the appearance of such coatings and their general lack of serviceability. In some cases, prior fire retarding coatings do not dry to a tack-free surface, or are so brittle as to chip off the surface to which they are applied, or are so rough and coarse in texture as to require recoating with conventional paints to obtain acceptable appearance or are so water sensitive as to be easily spoiled by water. Upon recoating, much of the fire-retardant value is lost.

From an exhaustive study of the prior art compositions intended for fire-retardant purposes and tests made to determine their effectiveness, the greatest promise for successful development is found to reside in coatings which are capable upon application of heat or flame, to expand into a foam of non-combustible foraminous material.

Prior art compositions containing the water-soluble silicates are of this type, but possess many inherent objections. Purely organic types of binders having a degree of thermal plasticity when heated have been introduced. Compounds of this class have been previously suggested, but are objectionable as coatings for protective and decorative use because of one or more of the common objections hereinafter discussed.

Among the defects present in the prior art fire-retardant coatings have been (1) Lack of smoothness of the coating applied. (2) Relatively short life of the coating after water-reduction to a fluid consistency. Often several hours is sufficient to cause commercial fire-retardant liquid coatings to become so heavy in body or viscosity (thickness) that they are no longer sufficiently fluid to be applied. (3) Poor adhesion after application to a surface to be protected against fire propagation. A relatively short time after application, the coating peels or chips off from prepared surfaces and no longer affords protection to that area. (4) Extreme water sensitivity after application so that the applied film is easily removed or spotted when contacted purposefully or accidentally with water. (5) Upon exposure to fire or extreme heat, the cellular mat formed lacked uniform cell size and cell distribution, and thus lacked efficiency as a heat-insulating barrier, which is one essential or prerequisite of effective fire retardance.

Marked improvement in overcoming the defects described has been achieved by a combination of specific ingredients as hereinafter described. It appears that a combination of various organic and inorganic constituents are essential to the production of a fire-retardant coating having optimum film characteristics and fire-retardant potential. The composition herein described is presently prepared as a dry-powdered material further reducible with water, or optionally, a portion of the binder in aqueous solution, furnished in a separate container, may be used as the fluidizing medium.

The essential components to produce my improved fire-retardant coating composition comprise in combination: (1) An essentially alkaline catalyzed urea derivative-aldehyde resin. (2) An acidic ammonium phosphate catalyzed condensation product of an aldehyde and a carbamide selected from the group consisting of cyanamide, dicyandiamide and guanidine. (3) An inorganic ammonium salt capable of releasing ammonia under flame conditions. (4) A saturated aliphatic organic compound selected from the group consisting of dicarboxylic acids, hydroxy dicarboxylic acids and the salts of said acids, and (5) A blend of inorganic pigments consisting essentially of China clay and zinc oxide. Other components may be used in minor amounts, e. g., titanium dioxide to increase opacity and whiteness; humectants, to plasticize the film; etc.

The materials recited when combined in the manner and within the limits of proportion as hereinafter described, upon reduction to a fluid state may be applied by brushing, spraying or roller-coater, or as in certain commercial installations by squeegee or doctor-blade to provide a smooth, non-tacky film, having a pleasing appearance, and a surprising water-resistance in view of the nature of the ingredients employed.

If an area covered with the coating is subjected to flame temperature, the film expands in thickness to form a voluminous multicellular insulative mat and after continued exposure, converts over to a charred mass, effectively preventing heat transfer to combustible surfaces so coated, and flame propagation to areas adjacent the flame source. Upon extinguishment of the flame, combustion is not sustained on the areaway subjected to flame, and there is no after-glow which might ignite flammable gases exposed to such surface. After the fire has expended itself, the expanded coating may be easily scraped from the charred areaway and the surface underneath will be found not to have deteriorated in character, even though the flame temperatures may reach extremes of heat.

In the compositions of the class herein described, a surprising structural, or bridge-like characteristic between the base area and the developed insulative blanket from the expanded fire-retardant coating has been observed which enhances the value of the developed mat during critical fire periods. This bridge-like structure is of value where flames under high velocities impinge upon coated areas during the progress of a fire.

The initially important component of my fire-retardant composition is the use of two thermally responsive resins, which apparently blend together during exposure to fire and contribute materially to the success of the combination of components which make up the herein described coating. Lacking a suitable generic term to cover the urea derivative-aldehyde class of resins useful, compounds selected from the group consisting of urea, thio urea, butyl urea, hydroxy urea, ethanol urea, guanyl urea, diethylene tri-urea, acetyl urea, allyl urea and ethylidene urea, are intended as substantial equivalents. From a cost viewpoint, urea is the preferred member of the group recited, but, as is apparent from the listing, other urea derivatives capable of resin formation with aldehydes may be substituted therefor, preferably, only in part. The condensation of the urea derivative-aldehyde resin desired may be catalyzed with acid during a portion of the resin-forming reaction, but in order to maintain the requisite stability and water solubility, alkaline catalysts are preferred, and alkaline conditions are to be maintained during at least a portion of the reaction period.

The second class of resins which is used in combination in the coating under consideration consists of an ammonium phosphate catalyzed, aldehyde condensation with an amide of the class consisting of cyanamide, dicyanamide and guanidine. In this latter class of resin, the preferred resin is an ammonium phosphate catalyzed condensation product of dicyandiamide in which not exceeding 50 percent of the dicyandiamide may be substituted for by one of the carbamides mentioned in the first resin class. It is preferable not to make any substitution for the dicyandiamide, but where essential for one reason or another, substitution as suggested does not unduly affect the fire-retardant quality of the product. It should be noted that such substitution is possible, but not a preferred procedure. Up to 17 percent of the dicyandiamide or reactant of the class described may also be substituted for with melamine, but again is not to be preferred. More than 17 percent of melamine gives rise to instability of the aqueous resin syrup, and to a less fully developed insulative film upon fire exposure of the applied coating composition.

In the first resin, the ratio of urea equivalent to aldehyde may be varied broadly from a molecular ratio of 1:1 to 1:8, but the preferred range has been found to lie between 1:1 to 1:3.

While other aldehydes may be substituted for formaldehyde, as is known in the art, formaldehyde is preferred, and may be obtained from a formalin solution, or may be derived for the reaction from the polymeric forms of formaldehyde, e. g., para formaldehyde during the course of the resin-forming reaction.

In each of the above resins other modifying reactants may be incorporated in the resin-forming reaction for purposes of solubility, stability, etc., including lower molecular weight water soluble aliphatic alcohols of both monohydric and polyhydric nature. The polyhydric alcohols are useful when the resulting resinous products tend to become water insoluble during or after condensation, but are not essential to the resins as herein described.

As a result of a considerable amount of experimental data gathered in investigation of the effects of substitutions and proportionate changes in the above-described two classes of resins, convincing evidence was obtained to show the value of combination of two separate and distinct resins. Superiority is observed in performance under fire tests of the coatings. When an alkaline catalyzed amine-aldehyde resin is used as the sole thermally responsive resin, thickness of insulative blanket developed from the coating is wanting. There are fewer cells developed of less uniform size, and the inefficiency of the fire-retardant coating is reflected in the lack of reserve expansion potentials in the coating immediately above and adjacent to the area intended to be protected.

Nor is the resultant fire-expanded coating as efficient and effective when the resinous component is wholly a dicyanamide-aldehyde resin of the second class. In this instance, also, the structural development of the flame-expanded material is inferior as compared with a combination of the two species of resins. Flame-expanded films of the latter formulations are characterized by the development of relatively few large cells of weak structure and reduced heat insulative value. Addition of as little as 5 percent of urea derivative-aldehyde resin to a formulation wherein dicyandiamide-aldehyde resins are the sole resinous components effected a marked improvement in the development of smaller, more multitudinous cells under actual fire tests.

While it is preferred to arrest the resin-forming reaction, or so control it as not to form water-insoluble products, water-insoluble reaction products have been successfully utilized in the case of the amide-aldehyde resin without excessive loss of adhesion and water resistance in the final fire-retardant coating material. Where equipment is available to spray-dry the resin at sufficiently low temperature to prevent further reaction to a water-insoluble form of the resins, such procedure is preferred. When the resins are combined in the dry state, there is no danger of interreaction, but when combined in the wet state, stability on storage beyond several weeks (our formulas have been stable several months in the wet state) become problematical. Retention of the water-soluble character of both resinous components serves the dual purpose of a binder or glue to hold the remainder of the ingredients fast to the surface to which the coating is applied and to further assure the thermal plasticity of the resinous components when exposed to flames, the latter quality being essential to cell formation.

The condensation reactions useful to form the resins of each of the two classes described above may proceed under a variety of time, temperature and pressure conditions. The temperature may be varied from room temperature to the reflux temperature of the reactants, depending in part upon the catalysts selected, and may be conducted at sub-atmospheric, atmospheric or super-atmospheric pressures.

The preferred urea derivative-aldehyde resin is a water-soluble alkaline condensation product of urea and formaldehyde, wherein the molar ratio of urea to formaldehyde may be from 1:1 to 1:8 but is preferably 1:1 to 1:3. The second resin is a water-soluble acidic ammonium phosphate catalyzed reaction product of a compound selected from the group consisting of cyanamide, dicyandiamide and guanidine and formaldehyde, and is preferably the dicyandiamide-formaldehyde combination wherein the molar ratio is broadly from 1:1 to 1:4 and preferably from 1:1½ to 1:3.

The character of the fire-retardant coating is assisted materially by the inclusion of ammonia or amine salts of inorganic acids which of themselves are useful as dehydrating agents. Organic bases useful as the cationic part of the salt include ammonia, methyl amine, dimethyl amine, ethyl amine, ethylene diamine, urea, melamine, morpholine and other similar nitrogenous bases of which the aforementioned compounds are representative.

The anionic part of the salt is preferably a phosphate, but secondarily useful radicals include sulfates, borates and sulfamates.

Ammonia liberating salts of the above class assist in increasing the thickness of the insulative blanket formed from the coating upon flame exposure. The decomposition products of the salt under extremes of heat appear to assist in the prevention of flame propagation by accelerating carbonization of the resinous components and the arrest of after-glow and further ignition of combustible gases coming into contact with the insulative blanket developed from the fire-retardant coating.

A third essential component of my fire-retardant coating composition is generically identified and defined as a non-polymeric organic aliphatic polybasic acid radical containing constituent. This component may be either an organic aliphatic polybasic acid, per se, or preferably the non-water soluble metal salt of such acid containing one or more equivalents of the metal per mol of said acid.

Oxalic and malonic acids are useful members of the homologous series, but more desirable products result with the acids above malonic including succinic, glutaric, adipic, azelaic and sebacic acids. However, the presence of an additional hydroxyl group in the polybasic acid radical has been observed to be still more advantageous to the ends sought. Acids in the preferred, latter, category include malic, citric and tartaric acids. Of these, citric and tartaric acids and the zinc salts thereof stand out as being of greater value in my fire-retardant paint than the generic group as a broad class.

Of the metallic salts of the described acids, sodium potassium and ammonium are objectionable in some instances due to their water solubility and the sensitivity of the coating to water is increased by their use. The zinc, lead, magnesium and calcium salts of the monomeric organic aliphatic polybasic acids in combination with the other essential ingredients of the composition contribute materially to the adhesion and water-resistance of the coating after application, and further combine under flame conditions to assist the development of strength of the fire-expanded coating at the point of juncture between the base surface being protected and the flame-formed carbonaceous "biscuit." Of all the individual species, best results are obtained with the zinc salt of citric acid followed closely thereafter by the zinc salt of tartaric acid.

In a standard set of formulations, identical except for citric acid in one instance and zinc citrate in another, a wash resistance test revealed failure of the former after 80 oscillations of the brush as compared with 110 scrubs with the latter.

Zinc citrate further contributes to the development of uniformly fine texture of the flame-expanded coating, and such increased uniformity is deemed to contribute materially to the reduction in the rate of heat transfer over and through areas subjected to fire. Dicarboxylic acids above sebacic are of little interest, for above azelaic a tendency is noted for formation of overly large cells in the fire developed "biscuits" of films containing the longer hydrocarbon chains. Certain observations also lead to the theory that inclusion of these organic acid radical containing components assist in the maintenance of non-combustibility of the intumesced films of such fire-retardant coatings as the heat intensity is increased, as after prolonged exposure to flame and fire.

While a fairly effective fire-retardant composition of a transparent nature can be and has been formulated from the constituents priorly described herein, the four component system comprising (1) an alkaline catalyzed water-soluble urea derivative-aldehyde resin; (2) an ammonium phosphate catalyzed water-soluble condensation product of an aldehyde and a compound of the class consisting of cyanamide, dicyandiamide and guanidine; (3) a monomeric organic aliphatic dicarboxylic acid radical containing constituent; and (4) an ammonia liberating nitrogen containing salt of an inorganic acid; is further improved as to appearance, lack of after-tack or stickiness and efficiency as a fire-retardant by further combination therewith of specific pigments. Pigmentation or pigment loading also effects marked change in the structural characteristics of the cellular mat or "biscuit" resulting from flame impingement upon the coating after application. The specific pigments are china clay and zinc oxide. If all china clay is used as pigmentary component, the cell structure of the flame-exposed coating is large and heterogeneous in nature. Zinc oxide seems to effect control over this phenomena and its presence in the quantities indicated brings the size of the said cells under control to a more uniform or regular structure. If no china clay is present, and only zinc oxide is employed, there appears almost complete severance of the insulative coating or biscuit from the base surface upon exposure to flame. China clay effects the development of pillars of substance from the base coated to the flame-formed insulative mat. This bridge-like structure adds materially to the adhesion of the insulative blanket of carbonaceous material during the course of a fire and prevents removal of large sections of the protective coating which otherwise might be removed by their own weight or swiftly moving gases at crucial periods during a fire. The proportions of zinc oxide to clay are not critical in the sense of general function of the composition, but superior results are obtained when broadly from 20 to 45 percent, and preferably from 25 percent to 35 percent of the total pigment by weight is zinc oxide.

It is apparent without discussion that minor amounts of other pigmentary materials may be included with the zinc oxide and china clay for their tinting or coloring effect. For enhancing brightness, titanium dioxide is a well-known primary pigment. Chrome green, chome yellow, various iron oxides, phthalocyanine blue, and other colored pigments may be incorporated for specific color development in the coating. Additions of these pigments in the reasonable amounts necessary to produce desired colors do not materially interfere with the resultant fire-retardant quality of the final coating.

EXAMPLE 1

1015 parts para formaldehyde
600 parts urea
180 parts butyl urea
1000 parts methanol
Q. v. 10% NaOH aqueous sol.
Q. v. 28% $NH_4OH$ aqueous sol.

All of the above ingredients are weighed into a vessel equipped with a reflux condenser and stirrer and the pH of the mixture adjusted to 10.

The mixture is thereafter heated to a temperature of 160 degrees F. and held for one hour. The pH is again readjusted with ammonium hydroxide to a value of 8 and an additional cook of one hour at 160 degrees F. is made.

The resinous syrup was thereafter filtered and the pH adjusted to 5 with $H_3PO_4$ to give a very stable resinous solution.

EXAMPLE 2

1050 parts formalin (37%)
600 parts urea
750 parts methanol
3.8 parts 25% NaOH sol. (aqueous)

The above ingredients when mixed together produced a solution having a pH of 10. The mixture was weighed into a vessel equipped with reflux condenser and stirred and refluxed at 190 degrees F. for one hour. Thereafter the pH was brought over on the acid side (3.5) with $H_3PO_4$ and held at 190 degrees F. for an additional four hours (reflux temperature). The pH was again adjusted with $NH_4OH$ solution (28%) to a pH of 7.7 and refluxed an additional two hours. A resulting aqueous resinous solution having a viscosity of D (Gardner) and 54 percent solids was filtered for subsequent use in fire-retardant paint.

EXAMPLE 3

120 parts urea
162 parts formalin (37%)
75 parts 28% ammonium hydroxide

No heating necessary, but some heat of reaction. Remains as stable liquid (8 months).

EXAMPLE 4

120 parts urea
162 parts formalin
10 parts solution (65% solids in sol.) (100 parts 29% $NH_4OH$) (96 parts $H_3PO_4$)

Heated to dissolve urea in formalin with agitator in open vessel between 60 and 70 degrees C. Upon addition of the catalyst, e. g., 10 parts of 65 percent $(NH_4)_2HPO_4$ solution, the reaction was violently exothermic and a frothy solid was obtained which was broken up and air dried. After drying, the resin was further ground to a fine powder.

EXAMPLE 5

120 parts urea
260 parts formalin
158 parts para formaldehyde

Add the above to an open vessel and stirred without warming to a turbid solution (e. g., ½ hour).

245 parts 29% $NH_4OH$ added slowly to the above not allowing the temperature to increase above 180 degrees F.

EXAMPLE 6

158 parts para formaldehyde
60 parts urea
220 parts formalin (37%)

The above were stirred together in an open vessel to form a slightly turbid solution.

345 parts ammonium hydroxide were added slowly, not allowing the temperature to exceed 180-190 degrees F. (over an hour period).

Result was a stable solution of resin useful in the compositions herein described.

EXAMPLE 7

360 parts dicyandiamide
695 parts formalin (37%)
445 parts water
500 parts $(NH_4)H_2PO_4$ The dicyandiamide, water and formalin were stirred together, warming to assist solution. After solution, the monoammonium phosphate is added while agitating the mixture. An exothermic reaction raised the temperature of the reaction mixture to about 180 degrees F. Upon cooling, a resinous solution develops which initially is crystal clear but upon aging becomes slightly turbid.

EXAMPLE 8

135 parts dicyandiamide
347 parts formalin (37%)
222 parts water
32 parts urea
250 parts $(NH_4)H_2PO_4$ The formalin was reduced with the water and added to a previously blended dry mixture of urea and dicyandiamide.

To the suspension, the monoammonium phosphate was added in small portions, allowing the temperature to increase to 170 degrees F. A clear solution formed shortly after the addition of the phosphate and stirring continued for approximately half an hour.

EXAMPLE 9

Similar to Example 8, but substituting to bring molecular ratio of dicyandiamide and urea to a 1:1 ratio. The resulting solution was initially fluid, but formed a soft gel upon prolonged standing.

EXAMPLE 10

78.5 parts dicyandiamide
173.5 parts formalin
111.0 parts water
16.0 parts melamine
125.0 parts $(NH_4)H_2PO$ Made same as in Example 8.

The resulting product, initially fluid, formed a solid gel in about a week, and could no longer be utilized to form a part of the binder phase (adhesive portion) of the intended system described.

EXAMPLE 11

357 parts monoammonium phosphate
68 parts zinc citrate
118 parts china clay
46 parts zinc oxide
78 parts resin solution—Example 2 were mixed together and the volatile portion allowed to evaporate. The dry substance was then ground in a fluid energy mill, although an impact mill may be alternatively employed. In a separate container was weighed 700 parts of the resinous solution described in Example 7.

Before application of the composition, the resin of Example 7 was added to the prepared pigmentary powder to form a fluid aqueous system which is thereafter applied by brush to the area to be protected. It is desirable for best result to apply the coatings generously to the area to be coated.

This formula represents about the minimum pigment loading suitable to the practice of this invention. Below this amount of pigment a tacky character of the film becomes objectionable, and the "structure" of the material after exposure to flame is less strong and more heterogeneous as to cell size than is deemed desirable.

EXAMPLE 12

515 parts monoammonium phosphate
98 parts zinc tartrate
170 parts china clay
68 parts zinc oxide
20 parts resin solution—Example 1

The above mixture was compounded by feeding a coarse mixture of the first four items through a hammer-type pulverizer and bleeding into the feed, the resin solution. The resulting fine powder appeared dry and was kept in a separate package from the second reducer therefor. To the above, at time of use, was added 100 parts of the dicyandiamide-urea-formaldehyde of Example 8, and sufficient additional water to make a fluid paint. After thorough incorporation of the above ingredients, a smooth fire-retardant composition was obtained. The above formulation represents a maximum pigmentation type formulation. Increased pigmentation detracts from the height of "biscuit" developed upon exposure to fire.

EXAMPLE 13

425 parts monoammonium phosphate
80 parts zinc citrate
140 parts china clay
55 parts zinc oxide
50 parts dry resin of Example 4

The above ingredients were passed through a micropulverizer to form a fine dry powder. The resultant powder was further reduced with 300 parts dicyandiamide resin of Example 7 and 21 parts water. The resulting paint was applicable by brush to yield an excellent fire-retardant composition. The above formula illustrates the preferred pigment percentage.

EXAMPLE 14

Same ingredients as in Example 13, but a single container dry package material was produced by spray drying the resultant resin of Example 7 and incorporating it into the other dry stocks by means of a fluid energy mill. The powdered product may be reduced with water to form a film characterized by its water resistance upon drying, and the high thermal resistance of the insulating mat which develops upon exposure of the coating to flame.

EXAMPLE 15

Same as in Example 13, except 100 parts of the resin solution of Example 3 was substituted for the dry resin of Example 4 and incorporated with the dry stocks as in Example 12.

750 parts of the resultant powder are thereafter combined with 250 parts of resin solution of Example 7 to form a fluid water-reducible paint useful as a fire-retardant coating.

The general range of proportions of the essential ingredients of my fire-retardant coating are summarized in the following table, on a dry basis.

*Table I*

| Components | Broad Range | Preferred Range |
| --- | --- | --- |
| | *Percent* | *Percent* |
| Urea derivative-aldehyde resin solids | 1–10 | 4–6 |
| Dicyandiamide-aldehyde resin solids | 5–35 | 15–25 |
| Ammonia liberating salt | 35–55 | 40–50 |
| Polybasic acid radical component | 7–12 | 8–10 |
| China clay | 12–20 | 15–20 |
| Zinc oxide | 5–10 | 5–8 |

The preceding examples are illustrative, but are not to be construed as limiting upon the variations which are within the skill of the art and the scope of the appended claims. It is believed the examples selected herein make clear the various operations and the preferred formulations of compositions useful as fire-retardant coatings. Of necessity all of the possible variations within the scope of the disclosure have not been specifically illustrated, as such inclusion would unduly lengthen the specification.

Having thus described and illustrated an improved coating composition useful for retarding the spread and reducing the resultant damage from unfriendly fire, I claim:

1. A water reducible potentially reactive fire-retardant coating composition which comprises in combination: (1) 1% to 10% of an alkaline catalyzed amide-aldehyde resin wherein the amide is selected from the group consisting of urea, thiourea, butyl urea, hydroxy urea, ethanol urea, guanyl urea, diethylene triurea, acetyl urea, allyl urea and ethylidene urea; (2) 5% to 35% of an acidic ammonium phosphate catalyzed condensation product of an aldehyde and a second amide selected from the group consisting of cyanamide, dicyandiamide and guanidine; (3) 35% to 55% of an inorganic ammonium salt capable of releasing ammonia under flame conditions; (4) 7% to 12% of a monomeric saturated aliphatic organic compound selected from the group consisting of dicarboxylic acids, hydroxy dicarboxylic acids, acid salts and salts of said acids containing not less than 1 nor more than 8 methylene groups and (5) the remainder of the composition consisting of a blend of pigments comprising china clay and zinc oxide.

2. A water reducible fire-retardant coating composition comprising in combination: (1) from 1 to 10% of a urea-aldehyde resin condensed under alkaline conditions; (2) 5 to 35% of an acidic ammonium phosphate catalyzed resinous condensation product of an aldehyde and an amide selected from the group consisting of cyanamide, dicyandiamide and guanidine; (3) 35 to 55% of an inorganic ammonium salt capable of releasing ammonia under flame conditions; (4) not less than 7% nor more than about 12% of a monomeric saturated aliphatic organic compound selected from the group consisting of dicarboxylic acids, hydroxy dicarboxylic acids and their salts, containing not less than one or more than eight methylene groups, the remainder of the composition consisting of a blend of pigments comprising china clay and zinc oxide.

3. A water reducible potentially reactive fire-retardant coating composition which comprises in combination: (1) 1% to 10% of an alkaline catalyzed urea-formaldehyde resin; (2) 5% to 35% of a monoammonium diacid phosphate catalyzed condensation product of formaldehyde and dicyandiamide; (3) 35% to 55% of an inorganic ammonium salt capable of releasing ammonia under flame conditions; (4) 7% to 12% of a monomeric saturated aliphatic organic compound selected from the group consisting of dicarboxylic acids, hydroxy dicarboxylic acids, acid salts and salts of said acids containing not less than one nor more than 8 methylene groups and (5) the remainder of the composition consisting of a blend of pigments comprising china clay and zinc oxide.

4. A water reducible potentially reactive fire-retardant coating composition which comprises in combination: (1) 1% to 10% of an alkaline catalyzed urea-formaldehyde resin; (2) 5% to 35% of a monoammonium diacid phosphate catalyzed condensation product of formaldehyde and dicyandiamide; (3) 35% to 55% of a monoammonium phosphate; (4) 7% to 12% of a zinc salt of a saturated aliphatic dicarboxylic acid containing not less than 1 nor more than 8 methylene groups; (5) 17% to 30% of a blend of pigments comprising china clay and zinc oxide said composition characterized after exposure to flame by development of an intumescent, evenly multicellular, semi-carbonaceous blanket-like structure having a plurality of pillar-like supporting elements between the base so coated and the said intumescent blanket, absence of afterglow and low rate of heat transfer.

5. A water reducible potentially reactive fire-retardant coating composition which comprises in combination: (1) 4% to 6% of an alkaline catalyzed urea-formaldehyde resin; (2) 15% to 25% of a monoammonium diacid phosphate catalyzed condensation product of formaldehyde and dicyandiamide; (3) 40% to 50% of monoammonium phosphate; (4) 8% to 10% of a zinc salt of a saturated aliphatic dicarboxylic acid containing not less than 1 nor more than 8 methylene groups and (5) 20% to 28% of a blend of pigments consisting essentially of china clay and zinc oxide.

6. As in claim 5 wherein the zinc salt (4) is zinc citrate.

7. As in claim 5 wherein the zinc salt (4) is zinc tartrate.

8. As in claim 5 wherein the zinc salt (4) is zinc succinate.

9. A water reducible potentially reactive fire-retardant coating composition which comprises in combination: (1) 1% to 10% of an alkaline catalyzed urea-formaldehyde resin wherein the molecular ratio of urea to formaldehyde is from 1:1 to 1:8; (2) 5% to 35% of a monoammonium diacid phosphate catalyzed condensation product of formaldehyde and dicyandiamide wherein the molecular ratio of dicyandiamide to formaldehyde is from 1:1 to 1:4; (3) 35% to 55% of monoammonium phosphate; (4) 7% to 12% of the zinc salt of saturated aliphatic dicarboxylic acid containing not less than 1 nor more than 8 methylene groups and (5) 17% to 30% of a blend of pigment of which from 25% to 45% by weight of the pigment blend is zinc oxide and a major proportion of the remaining pigment is china clay.

10. A water reducible potentially reactive fire-retardant coating composition which comprises in combination: (1) 4% to 6% of an alkaline catalyzed urea-formaldehyde resin wherein the molecular ratio of urea to formaldehyde is from 1:1 to 1:3; (2) 15% to 25% of a monoammonium diacid phosphate catalyzed condensation product of formaldehyde and dicyandiamide wherein the molecular ratio of dicyandiamide to formaldehyde is from 1:5.5 to 1:3; (3) 40% to 50% of monoammonium phosphate; (4) 8% to 10% of the zinc salt of a saturated aliphatic dicarboxylic acid containing not less than 1 nor more than 8 methylene groups; (5) 20% to 28% of a blend of pigments comprising essentially zinc oxide and china clay wherein the percentage of zinc oxide in the pigment blend is from 25% to 35% of the total pigment weight and at least 50% of the remaining pigment is china clay said composition characterized after exposure to flame by development of an intumescent evenly multicellular semi-carbonaceous blanket-like structure having a plurality of pillar-like supporting elements between the base so coated and the said intumescent blanket, absence of afterglow and low rate of heat transfer.

11. A water-reducible potentially reactive fire-retardant coating composition which comprises in preferred combination: (1) from 4 to 6% of an alkaline catalyzed urea-formaldehyde resin, the molecular ratio of urea to formaldehyde within the ratio of 1:1 to 1:3; (2) from 15 to 25% of an ammonium phosphate catalyzed dicyandiamide-formaldehyde resin, the molecular ratio of dicyandiamide to formaldehyde within the ratio of 1:1½ to 1:3; (3) from 40 to 50% of monoammonium phosphate; (4) from 8 to 10% of the zinc salt of a saturated aliphatic dicarboxylic acid containing at least one hydroxy group and not less than one nor more than eight methylene groups; (5) and from 20 to 28% of a blend of inorganic pigments consisting essentially of China clay and zinc oxide wherein the zinc oxide is from 25% to 35% of the total pigment weight.

12. A water-reducible fire-retardant coating composition which comprises in combination by weight, the following:

425 parts monoammonium phosphate
80 parts zinc citrate
140 parts china clay
55 parts zinc oxide
50 parts alkaline catalyzed urea-formaldehyde resin
120–180 parts ammonium phosphate catalyzed dicyandiamide-formaldehyde resin.

References Cited in the file of this patent

UNITED STATES PATENTS

| Number | Name | Date |
|---|---|---|
| 2,452,054 | Jones et al. | Oct. 26, 1948 |
| 2,483,330 | Bartlett et al. | Sept. 27, 1949 |
| 2,530,458 | Frisch | Nov. 21, 1950 |
| 2,582,961 | Burnell et al. | Jan. 22, 1952 |